United States Patent [19]

Sparkes

[11] Patent Number: 4,993,073

[45] Date of Patent: Feb. 12, 1991

[54] DIGITAL SIGNAL MIXING APPARATUS

[76] Inventor: Kevin J. Sparkes, 8 Pelham Road, Lea Park, Thame Oxon, OX 9 3WH, United Kingdom

[21] Appl. No.: 253,084

[22] Filed: Oct. 3, 1988

[30] Foreign Application Priority Data

Oct. 1, 1987 [GB] United Kingdom .................. 8723086
Dec. 29, 1987 [GB] United Kingdom .................. 8730251

[51] Int. Cl.[5] .................................................. H04B 1/00
[52] U.S. Cl. ...................................................... 381/119
[58] Field of Search ........................ 364/287; 381/119; 379/202

[56] References Cited

U.S. PATENT DOCUMENTS

| | | | |
|---|---|---|---|
| 3,987,291 | 10/1976 | Gooding et al. | 364/787 |
| 4,163,211 | 7/1979 | Miura | 364/787 |
| 4,230,908 | 10/1980 | Davis et al. | 381/119 |
| 4,283,788 | 8/1981 | Tamburelli | 364/724.2 |
| 4,479,240 | 10/1984 | McKinley, Jr. | 381/119 |
| 4,737,926 | 4/1988 | Vo et al. | 364/787 |
| 4,809,262 | 2/1989 | Klose et al. | 379/202 |

FOREIGN PATENT DOCUMENTS

| | | | |
|---|---|---|---|
| 3346500 | 4/1985 | Fed. Rep. of Germany | 381/119 |

OTHER PUBLICATIONS

Richards et al., "An Experimental 'All-Digital' Studio Mixing Desk", J. Avd. Eng. Soc., vol. 30, No. 3, Mar. 1982.

*Primary Examiner*—Forester W. Isen
*Attorney, Agent, or Firm*—Ross, Howison, Clapp & Korn

[57] ABSTRACT

A digital signal mixing device comprises a plurality of input channels (29, 30, 31, 32, 33) each having a respective signal input port (34, 35, 36, 37, 38) for analogue signals, an interface circuit (49) incorporating an analogue-to-digital converter, digital signal processing means (51, 66, 52, 50) for conditioning the digital signal to effect for example volume control, tone control and introduce other musical effects, and summing means (55) interconnecting the individual channel with next adjacent channels upstream and downstream thereof in a sequence such that mixing of the signals is effected by successive addition of the conditioned digital signals produced by an input channel to a signal representing the addition of the output signals from all input channels earlier in the sequence.

20 Claims, 3 Drawing Sheets

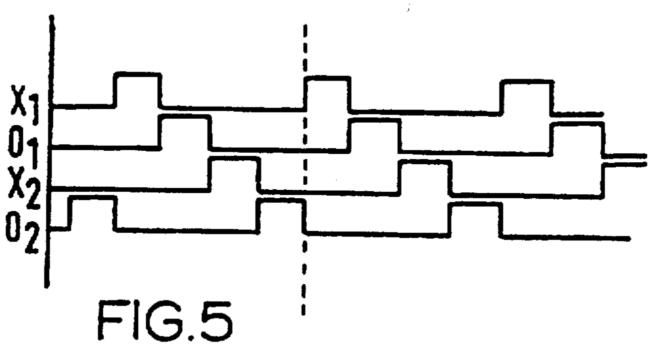
FIG.5
FIG.6
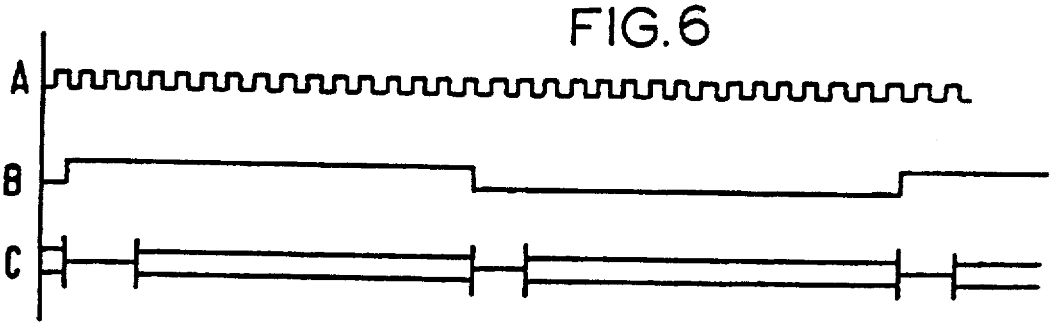
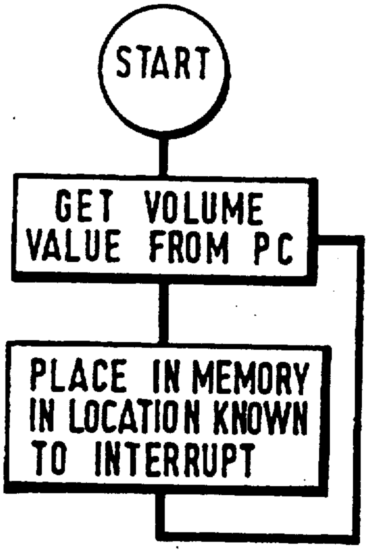
FIG.7A
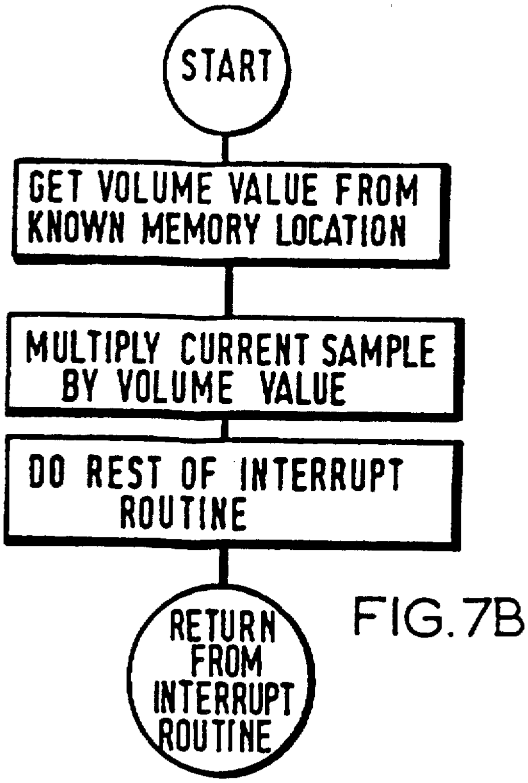
FIG.7B

DIGITAL SIGNAL MIXING APPARATUS

FIELD OF THE INVENTION

The present invention relates generally to signal mixing apparatus, and particularly, but not exclusively, to apparatus adapted for mixing digitized audio signals.

BACKGROUND OF THE INVENTION

Digitized audio signed mixing apparatus, commonly termed a "mixer", also conventionally acts to condition the incoming input signals by modifying their waveform in order to achieve selected effects. Examples of such effects include the so-called "echo" effect where an incoming signal is used as a basis to generate further signals displaced in time by an appropriate phase shift, and the so called "sherwe" effect where a single incoming signal is used to generate a plurality of similar such signals, each slightly different from the first in order to simulate a plurality of different substantially similar signal sources. Such mixing apparatus is used both at live concerts given by musicians or groups of musicians, and in recording studios, and in each case the incoming or input analogue signals are applied to the mixer unit by approriate input lines from associated transducers, which may be microphones in the case of singers or musical instruments, or special purpose transducers such as the magnetic audio transducers fitted to electric guitars.

Very often there are a considerable number of input signals which, for example in the case of a recording studio, must all be applied to two output lines constituting the left and right stereo outputs which will be recorded onto the master recording from which subsequent reproductions will be made. In some circumstances there are more than two output channels for special purposes, for example, at live concerts the output channels may feed amplifiers from which signals are taken for respective left and right banks of loudspeakers, or in recording studios there may be quadraphonic rather than stereophonic recording. Typically, however, each mixer comprises a considerably greater number of input channels than output channels and the mixer acts to direct signals from each input channel in selected proportions to one or more output channels. As mentioned above, the mixer also acts to process or condition the signals in dependence on specific requirements of the technician operating the mixer, and for this purpose the mixer is provided with a large number of control elements at a control panel whereby the operations to be performed on the input signals, such as filtering, attenuation, amplification, etc can be modified by the technician acting on the control elements such as potentiometers, switches and the like, in order to obtain the desired "mix" of input signs in the output. By skilful use of a mixer the technician can also eliminate unwanted noise components, make tone adjustments and balance the level of each input signal so as to produce an overall output which, in his opinion, best represents the performance in aesthetic terms. In doing this, unwanted components can be attenuated whilst others may be accentuated so that, for example, instruments which naturally produce less volume than others can be brought up to the same or similar volume level for the enjoyment of the listener.

Developments in recording techniques and in musical techniques have resulted in the production of mixer units having a very large number of controls for processing each individual input signal, and a correspondingly large number of input channels. Such mixers thus occupy a very large area and the physical manipulations required to effect processing of all the input signals can be arduous and difficult. Furthermore, it is necessary to make a note of the setting of each individual processing control in order to be able to reproduce the setting of a mixer, for example, when concerts are performed at different venues. Problems of repeatability therefore arise, as well as problems of reliability of physically varied analogue signal processing units such as rheostats, capacitors and the like.

The mixer unit very often forms the heart or central core of a recording studio and may be built into the fixed structure. For concerts at separate venues or sites, however, it is necessary to be able to transport the mixer unit from one place to another and to set it up with repeatable connections, at least initially, which can be modified by the sound technician to take account of variations in the acoustics or other constraints applied by the new concert venue.

Apart from the problems of repeatability and durability, problems of noise also arise with analogue mixing units, especially those which have a large number of input channels since the "noise" present on the output channel is directly related to the number of different input channels and switching operations performed on the individual signals within the mixer. In order to overcome the fidelity problem digital processing techniques have been proposed and, indeed, recording media, such as compact disc and digital audio tape, have been produced in which the analogue musical signal is sampled at a high frequency (typically, 43,000 Hertz) to produce a "digitised" signal, namely a train of digital numbers each representing the value of the analogue signal at the associated sampling instant. Difficulties have been encountered, however, in mixing and processing digital signals due to the large number of individual digital numbers which have to be handled. Moreover, conventional mixing techniques for producing a small number of output signals, for example, two stereo channels, from a large number of input channels, have involved the use of a separate mixing section to which all input channels are connected in parallel. This involves limitations on the available functions and prevents the mixer from being enlarged should this become necessary at some stage subsequent to initial installation.

One such digital signal mixing device is described in UK Pat. No. 2 028 055 which describes a digital signal mixing and operating circuit arranged to mix S-channel input digital signals to obtain T-channel output digital signals. This circuit is provided with a digital memory for storing the matrix elements in digital form and includes a matrix element determining circuit for determining the matrix elements in response to a desired mixing ratio of the S-channel input digital signals to be stored in memory.

Such digital signal mixing apparatus has the disadvantage of requiring not only analogue-to-digital conversion on the input lines for converting the incoming analogue signals into digital form, but also digital-to-analogue converters used to reconvert the digital signals into analogue form in order to be able to perform various of the mixing and signal processing operations. Unfortunately, however, analogue-to-digital conversion, like digital-to-analogue conversion involves the introduction of distortions due to non-linearity in the transfer characteristics of the analogue signal mixing circuit and, furthermore, such analogue signal mixing circuits are often affected by external noises which are unwanted in the output from the mixer.

Another disadvantage of known mixing systems is experienced when it is required to treat a number of input channels as a group. For example, the musical item or programme material may include a choir of singers which, because of the large number of individual voices involved, cannot all be catered for using a single microphone, but which necessitates the use of several microphones. Since, however, the choir is treated as a whole in terms of level, and because all the signals from the individual microphones may require the same special effect (such as echo) it is necessary in conventional mixing units to route the plurality of input channels relating to the choir to intermediate or subgroup channels which can then be used to process the signals and produce an output which is then mixed into the final output signal from the mixer.

SUMMARY OF THE INVENTION

The present invention seeks to provide mixing apparatus which overcomes most, if not all, of the disadvantages of known mixing units discussed above. Primarily, the mixing apparatus of the present invention acts to process digitised signals without requiring them to be reconverted into analogue form, and by using a novel signal summing technique makes it possible to reduce the physical dimensions of the apparatus while increasing its range of useful functions and at the same time making it possible to expand the unit to incorporate a greater number of input channels without any increase in the noise generated within the apparatus, and without increasing the size of the operator's control panel. Likewise, mixing apparatus formed in accordance with the principles of the present invention can be modified to introduce different, newly devised, signal processing operations to make available new musical "effects" without involving substantial dismantling and rewiring of the apparatus, as would be necessary with analogue signal mixing apparatus or the digital signal mixing apparatus of the prior art.

According to one aspect of the present invention, therefore, mixing apparatus for electrical audio signals comprises a plurality of input channel units for receiving respective analogue input signals from respective analogue signal sources, each input channel unit having a respective analogue-to-digital converter operable to convert an incoming electrical analogue signal into a train of digital number signals each representing the instantaneous value of the analogue signal at an associated sampling instant, digital signal conditioning means operable selectively to modify the digital number signals, and a common digital signal transfer unit connected to all the said input channel units in a sequence and incorporating means for adding the sequential digital number signals from each input channel unit to an accumulated signal formed from the addition of digital number signals from preceding input channels in the sequence, whereby to produce a digital output signal representing the sum of the conditioned digital number signals from the input channel units.

The digital signal mixing apparatus of the present invention thus completely avoids the necessity for "routing" different input channels to selected output channels, and entirely avoids the necessity for subgroup or intermediate channels since it is now possible to perform all the same signal processing operations on individual digitized input signals prior to their addition to the accumulated signal.

The present invention may also be considered as an audio signal mixer comprising a plurality of individual signal processing channels each having an input connectable to a respective analogue signal source, analogue-to-digital converter means operating to convert the analogue input signal into a sequence of digital number signals, means for conditioning the digital number signals so produced and an output for the conditioned digital number signals from the channel, the individual signal channels being connected to a first input of respective digital number signal summing means having a second input connected to the output of a next adjacent signal summing means whereby to produce an overall output channel signal comprising a mix of all the individually conditioned digital number signals. The mixer apparatus of the present invention thus acts, for each output channel (and there may be, for example, two such output channels forming a single stereo pair, four such output channels forming a quadraphonic quartet, or a different number of output channels for special purposes, such as multitrack recording) to produce an output signal by successive addition to a signal representing the "mix-so-far" at each step in the sequence of input channels connected to the signal transfer unit or signal summing means. Every input channel is thus permanently connected to each output channel, and the proportion of the input signal appearing at the output channel is determined by the signal processing units. For example, if it is required that a given input signal should appear only on the left output channel of a stereo pair and not on the right channel, the volume or "level" control in the processing circuit will be set to cancel out all the digital numbers representing the value of the input signal in the right output channel.

This control is preferably effected by means of a microprocessor in the form of a digital signal processor acting on a digital signal data memory under the control of an appropriate programme memory. The output signal is thus produced as a cumulative rather than a parallel process and this makes it possible to add additional input channels simply by connecting them to the end of the sequence so that what is initially the output mix is appiled to the "common" input of the new input channel whilst the new input signal is applied to the individual input thereof to produce a new cumulative mix comprising the original cumulative mix to which the new input signal has been added. By forming the mixer as a plurality of modular units physically supported on a rack it is a simple matter to add new channels as and when the requirement for additional input channels arises.

In another aspect the present invention provides a digital signal mixing device for generating an output signal from a plurality of analogue signals applied to the device on separate inputs, in which the analogue input signals are sequentially sampled to generate a train of sequential digital number signals each representing the instantaneous magnitude of the analogue signal, a plurality of digital number signal processing units connected in sequence each individually connected to a respective signal input and operative to condition the incoming digital number signal and to add the said incoming digital number signals to the signals output from the immediately preceding unit in the sequence.

Preferably control of the signal processing of the said digital number signals is effected via a central processing unit having address and data lines connected to the individual signal processing channels.

By providing control of the digital signal processing via a central microprocessor, it is possible to restrict the dimensions of the control panels operated by the audio technician to that of the microprocessor itself, the programme being arranged to display on its screen which channels are being modified, and in what way, by the operations performed on the keyboard or other input control system of the microprocessor (for example, a mouse). It is possible, therefore, for the microprocessor programme to incorporate sub-routines for monitoring the status of all control elements in each channel so that, for example, to treat a number of different channels as a group, it is merely necessary to set the control elements of the respective channels to the same setting.

The digital signal processor may act to implement volume and balance controls by processing the digital number signals.

Conveniently, the digital signal processor is operable to super impose a volume envelope on the signal by acting on the incoming digital number signals.

The means to add the conditioned incoming digital number signals may comprise an adder operable to sum a digital signal arriving from the digital signal processor on an input line therefrom, and a digital signal arriving from the output of the adjacent mixing section adder, and to produce an output digital signal for supply to the next adjacent section adder in the sequence. The output digital signal from each mixing section adder is conveniently transmitted on a parallel line between adjacent mixing section adders.

Each input channel is conveniently formed as a printed circuit on a printed circuit board with edge connectors for rapid connection and disconnection to a base element having interconnecting conductors for connection of adjacent printed circuit boards and connections to the said processor. The connections between adjacent printed circuit boards preferably interconnect these boards for transmission of the cumulative output signal from a channel to the next adjacent channel in the sequence. Signals on the parallel line which interconnects adjacent channels are conveniently time division multiplexed to provide for the processing of four simultaneous signals configured as two stereo pairs.

Controls of the signal processing of the digital number signals is conveniently effected via a central processing unit having address and data lines connected to the individual signal processing channels and the central processing unit has an associated programme memory for storing data on the different conditioning operations to be performed on the digitalized signal by the said digital processor in order to condition the signal prior to transfer to the mixing section. The programme memory may also store data for providing an output display representing the conditioning processes performed on the signals, together with adjustments effected via a keyboard linked to the micro-processor. The programme memory may also be operable to generate a display on a touch sensitive interactive video display screen indicating available adjustment options to the signal conditioning processes.

The digital signed mixing device of the invention may comprise a plurality of input channel units for receiving respective analogue input signals from respective analogue signal sources, each input channel unit having a respective analogue-to-digital converter operable to convert an incoming electrical analogue-signal into a train of digital number signals each representing the instantaneous value of the analogue signal at an associated sampling instant. Each input channel unit conveniently has an associated digital signal conditioning means operable selectively to modify the digital number signals, and a common digital signal transfer unit connected to all the said input channel units in sequence for adding the sequential digital number signals from each input channel unit to an accumulated signal formed from the addition of digital number signals from proceding input channels in the sequence.

DESCRIPTION OF THE PREFERRED EMBODIMENTS

Embodiments of the present invention will now be more particularly described by way of example, with reference to the accompanying drawings, in which:

FIG. 5 is a waveform diagram useful in explaining the operation of the mixer of the present invention;

FIG. 6 is a timing diagram illustrating the timing of a processor interrupt routine; and FIGS. 7*a* and 7*b* are flow charts representing the steps performed in a processor interrupt routine exemplifying volume control.

Figure 1:
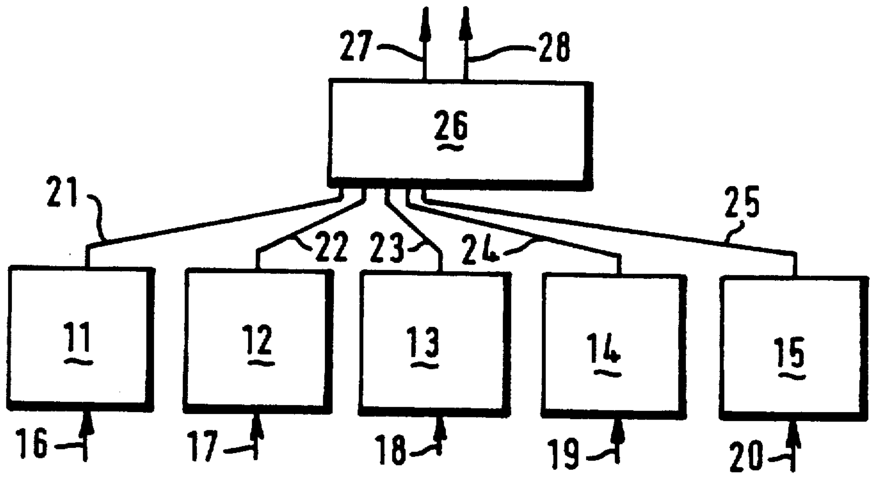
FIG. 1 is a schematic diagram illustrating a conventional mixing technique.

Referring now to the drawings, the conventional mixer illustrated in FIG. 1 comprises a plurality of input channels 11, 12, 13, 14, 15, each having an input port to which is connected a respective input line 16, 17, 18, 19, 20 carrying signals from a respective signal source such as a microphone, musical instrument transducer or the like. One or more signal sources may also be a recording of signals from a previous performance. Each individual channel 11–15 has controls (not illustrated) by means of which the input signals can be processed. These controls may include a so-called "fader" which is a potentiometer controlled by a linearly displaceable operating member to determine the level of the signal and thus the ultimate volume of that component of the signal in the eventual output, tone controls (usually in the form of filters), and special effects controls such as echo, reverberation, chorus, etc. After each individual signal has been processed it is supplied to an output port of the channel and conveyed via a respective output line 21–25 to a separate mixing section 26 which is provided with controls for selectively routing the signals arriving on the lines 21–25 to selected output lines illustrated by way of example as a left and right stereo pair 27, 28 in FIG. 1. The number of lines 21–25 connectable to the mixing section 26 is determined by the number of input ports to the mixing section 26 and this effectively determines, when the apparatus is made, the maximum number of channels available.

Figure 2:
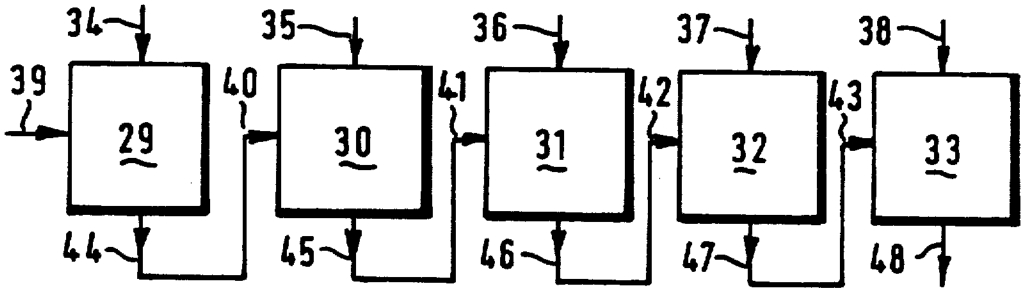
FIG. 2 is a schematic diagram illustrating the mixing technique performed by the mixer of the present invention.
Figure 3:
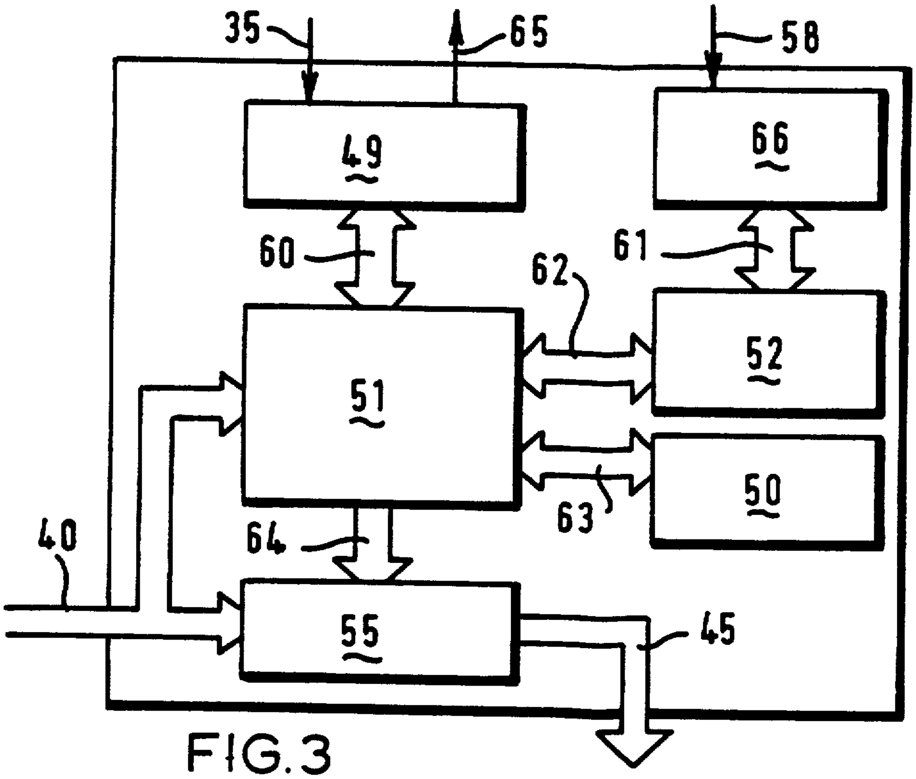
FIG. 3 is a block diagram of a single input channel of a mixer of the present invention.

By contrast, the mixing apparatus of the present invention, as illustrated in FIG. 2 includes a plurality of input channels, 29, 30, 31, 32, 33 (five have been shown for convenience in FIG. 2, although it will be appreciated that any number may be provided) each having a respective signal input port 34, 35, 36, 37, 38 which can be connected by an appropriate line (not illustrated) to a respective signal source as described above. The input channels 29–33 of the present invention differ from the input channels of the conventional mixer described in relation to FIG. 1, however, in that they also include a second input port 39, 40, 41, 42, 48 respectively. Referring now to FIG. 3 the constitution of a single channel, in this case the channel 30, is shown by way of example. Since the signals applied to the input ports 34–38 are analogue signals from the signal sources, each input channel 29–33 includes an interface circuit incorporating, inter alla, an analogue-to-digital converter operating to sample the analogue electrical signal arriving at input 34–38 and to produce from it a stream of digital number signals each representing the instantaneous value of the analogue signal at the sampling instant. As illustrated in more detail in FIG. 3, the input channel 30 recieves input signals at an input port 30 from a source such as an electrical musical instrument or a microphone. The input signals are in analogue form and are therefore passed to an interface circuit 49 comprising an analogue-to-digital converter having serial/parallel and parallel/serial conversion capability allowing it to convert the incoming analogue signals into serial digital form and further to convert the serial digital signals into parallel form for communication with a digital signal processor as will be described in more detail below.

Although only the input channel 30 is shown in FIG. 3 it will be appreciated that all the input channels are identical with one another and signal processing only differs in as much as the control elements described hereinafter are set to different values. The interface circuit 49 of the input channel 30 passes the digital data in parallel form to the digital signal processor 51 on a parallel line 60 and can itself receive data back in the same form from the digital signal processor 51. The interface circuit 49 has a serial output line 65 from which data in serial form can be output from the channel 30. The digital signal processor 51 also communicates via a parallel line 62 with a programme memory 52 and is in two way communication via a parallel line 63 with a short term data memory 50. The data signal processing unit is a very fast microprocessor designed for processing digitised signal: this processor acts to accept the digitised signal from the interface circuit 49 and to operate on it. For this purpose it can store samples in the memory 50 for the purpose of achieving any of the available special effects, under the control of the programme memory 52 and external controls arriving at the memory 52 on a parallel line 61 from a programme/data interface unit 68 receiving signals on a control input line 58 from an external control processor 54 (see FIG. 4) to process the digital signals in order to condition the signal ready for introduction into the output mix. In particular, the digital signal processor 51 acts to implement volume and balance controls as well as frequency equailsation (for the purpose of tone control) and to perform any one of a large number of special effects, such as reverberation, echo, compression and decompression, chorus, phasing and flanging, all of which are musical effects known to those skilled in the art, and further to superimpose, as required, a volume envelope onto the signal.

The processed digital signal is output from the digital signal processor 51 on a parallel line 64 to a mixing section 55 which in this embodiment is a 24 bit adder. The adder 55 has a second input 40 which carries a parallel digital input signal output from channel 29. The mixing section adder 55 acts to sum the two digital signals arriving, one from the digital signal processor 51 on the line 64 and the other on a 24 bit parallel line 40 from channel 29 and to produce an output digital signal on a parallel output line 46. The input signals on the 24 bit parallel line 40 are also supplied directly to the digital signal processor 51. All the channels 29, 30, 31, 32, 33 have similar outputs 44, 45, 46, 47, 48 and, as illustrasted in FIG. 2, the output 44 from the channel 29 is supplied to the input 40 of the channel 30. Similarly, the output 45 from the channel 30 is supplied to the input 41 of the channel 31 and the outputs 48 and 47 of the channels 31 and 32 are supplied to the inputs 42 and 43 of the channels 32 and 33 respectively. If, as illustrated in FIG. 2, the channel 29 is in fact the first channel in the sequence, the input 39 may be zero, in which case the output from the mixing section of channel 29 will be identical with the signal supplied to it from its digital signal processor 51. It will be appreciated therefore that the "mixing" of the signals on line 40 representing the "mix-so-far" output from the previous channel in the sequence and the signals arriving on serial line 35 from the individual source of the channel in question, can be achieved either by the software in the digital signal processor 51 or by the hardware, in the adder 65.

Figure 4:
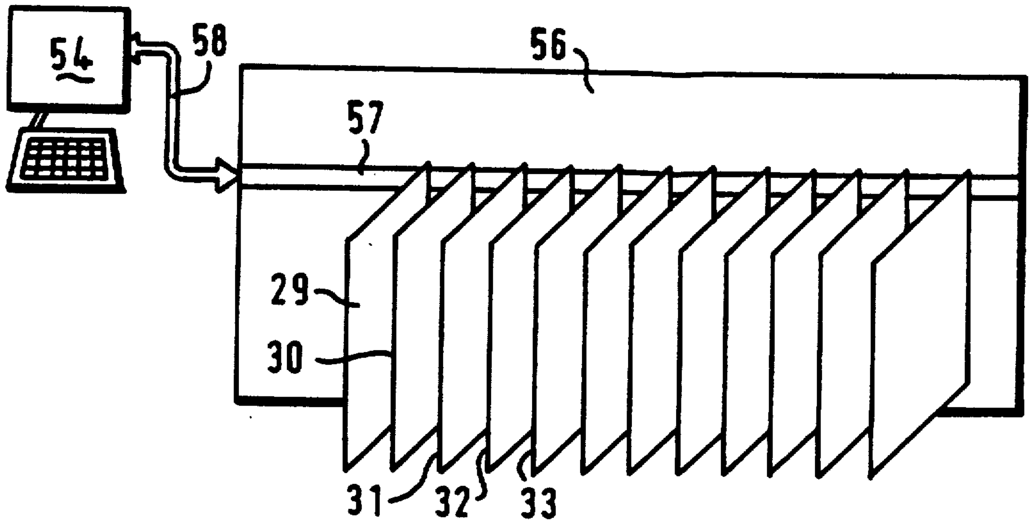
FIG. 4 is a schematic diagram illustrating the physical arrangement of components of the mixer of the present invention.

Turning now to FIG. 4, the physical arrangement of the mixer is illustrated. Each of the input channels is formed as a printed circuit on a printed circuit board, and for convenience only the first five boards have been identified with reference numerals matching those of the channels 29–33 of FIG. 2: again, all channel boards are identical. These boards are provided with connectors along one edge for connection to a mother board 56, having printed circuit interboard connections 57 which are connected via a line 58 to the external processor 54. The interboard connections 57 in fact join to the input port 53 leading directly to the data signal processor 51 as described in relation to FIG. 3. The interboard connections 57 on the mother board 56 also serve to pass the cumulative output signal from one channel to the other and in this respect, include the lines joining the output ports 44, 45, 46, 47 to the input port 40, 41, 42, 43 of the boards 29–33. The interboard connections 57 also include connections to supply power to each board and to connect other necessary signals to the board. The connection between the line 58 and the mother board 56 is effected via an RS 232 interface circuit which may be housed on the mother board or in the computer 54. The computer 54 is programmed to supply the necessary control signals to the input channels identifying the operations selected by the technician to be performed on the signal by any individual channel. If, for example, channels 30 and 31 are to be treated as a group (for example, if the lines 35, 36 lead from microphones from the same instrument or from a choir or the like) this can be set into the computer 54 so that any operation performed on an individual channel will be performed correspondingly on all other channels in the group. Signals on the 24 bit parallel line which interconnects the boards are time division multiplexed to provide capacity for four simultaneous signals. These would normally be configured as two stereo pairs in an arrangement as illustrated in FIG. 5. In this drawing signals X1 and X2 represent the first stereo pair and the signals 01, and 02 represent the other stereo pair.

The programme memory 52 stores data on the different musical effects which are to be performed on the digitised signal by the digital signal processor 51 in order to condition the signal prior to transfer to the mixing section 58, and the digital signal processor 51, under the control of the personal computer 54 acts to effect such processing. In practice, the programme may display the manner in which controls are being effected via the keyboard of the computer 54 (or other control instruments such as a mouse) in any convenient way. In a practical embodiment of the invention the screen of the computer may illustrate a representation of a conventional control element such as a switch or fader slide, and respond to control movements effected on such element by the keyboard or other control system. Touch-sensitive interactive screens may also be used. Automatic storage of the connections effected at any one time takes place so that reproduction of a set-up can be obtained. In this respect, a recording studio may wish to have several "takes" of a particular musical piece with the mixing apparatus set differently or changed during a performance, and there is a considerable saving in time if a given setting can be reproduced quickly by identifying the whole set up with a suitable characteristic reference rather than the operator having to go through all the individual controls and set them up again by memory or by reference to a set of notes.

As will be appreciated, expansion of the mixing apparatus of the present invention can take place readily without any hardware penalty simply by plugging in a new input channel board to the mother board (if available slots exist) or by adding mother board extensions as well as input boards. If no additional change to the mixer is required, the output will then be taken from the new end of the array and the control processor 54 can automatically provide, via its sweep or monitoring of the boards, access to the new input channel for control processes. Further, should new musical effects be devised, the mixer can be upgraded to incorporate these simply by exchanging the programme memory 52 for a new chip, an operation which was not available using conventional mixers. Fidelity of the signals is not compromised by expansion and there is no hardware cost penalty because the controls appear on the screen of the computer 54 as software generated items.

A typical example of the manner in which the data signal processor 51 acts to modify the incoming data signals prior to combining them with the data signals from the previous channels in the sequence is given with reference to FIGS. 6 and 7. In FIG. 6 the square waveform A represents the "bit" clock signal, typically at a frequency of 1.4 MHz. The "word" clock frequency, represented by the waveform B is derived by dividing down from the bit clock by a factor of 32. The word clock is therefore synchronised with the same frequency: the interrupt routine of the digital signal processor is triggered by a leading or trailing edge of the word clock. As is known, an interrupt routine is a routine that is not called from another part of a software programme but is started by a trigger signal such as a voltage change on the processor interrupt line. The voltage change is in this case synchronised to the word sample frequency as can be seen from line C of FIG. 6 where the double line represents the "background" programme and the single line represents the interrupt, commencing each time upon the occurrence of a leading or a trailing edge of the word clock B.

As can be seen in FIG. 7 the cycle time of the background routine is in the order of $1\times10^{-3}$ seconds whereas the cycle time of the interrupt routine is of the order of $2.26\times10^{-5}$ seconds; the relative time periods shown in FIG. 6 are distorted in scale for the sake of illustration. Since the interrupt routine takes place in a very much shorter time span than the cycle time of the background it would not be discernible if drawn to scale in FIG. 6. The sampling time is typically in the region of 22 ms and the interrupt routines may include up to three hundred instructions (typically 190 to 200) which are all performed within the interrupt period.

Whilst the invention has been described in the foregoing with reference to preferred embodiments, modifications therein within the spirit and scope of the invention will be evident to those skilled in the art.

I claim:

1. A digital signal mixing device for generating an output signal from a plurality of analogue signals applied to the device on inputs of respective separate signal processing channels, in which the analogue input signals are sequentially sampled to generate a train of sequential digital number input signals each representing the instantaneous magnitude of the analogue signal, a plurality of digital number signal processing units connected in sequence, each said signal processing unit being individually connected to and part of a respective said signal processing channel and being operative to condition the incoming digital number signal, and each digital number signal processing unit having means to add the conditioned incoming digital number signals to the signals output from a respective immediately preceding unit in the sequence.

2. A digital signal mixing device as claimed in claim 1, in which control of the signal processing of the said digital number signals is effected via a central processing unit having address and data lines connected to each signal processing channel.

3. A digital signal mixing device as claimed in claim 2, in which the said central processing unit is adapted to perform subroutines to control each processing channel.

4. A digital signal mixing device as claimed in claim 2, in which each digital signal processing unit acts to implement volume and balance controls by processing its respective digital number signals.

5. A digital signal mixing device as claimed in claim 3, in which each digital signal processing unit acts to implement volume and balance controls by processing its respective digital number signals.

6. A digital signal mixing device as claimed in claim 3, in which each digital signal processing unit is operable to superimpose a volume envelope onto its respective digital number signal.

7. A digital signal mixing device as claimed in claim 2, in which each respective said means to add the conditioned incoming digital number signals comprises a mixing section adder operable to sum a respective digital number signal arriving from the respective digital signal processing unit, and a digital signal arriving from the output of a mixing section adder of a preceding signal processing channel in the sequence, and to produce an output digital signal for supply to a mixing section adder of a succeeding signal processing channel in the sequence.

8. A digital signal mixing device as claimed in claim 7, in which the output digital signal from each mixing section adder is transmitted on a parallel line to a succeeding mixing section adder.

9. A digital signal mixing device as claimed in claim 1, in which each channel is formed as a printed circuit on a printed circuit board with edge connectors for rapid connection and disconnection to a base element having parallel line interconnecting conductors for connection of adjacent printed circuit boards and connections to the said central processing unit.

10. A digital signal mixing device as claimed in claim 9 in which the connections between adjacent printed circuit boards interconnect these boards for transmission of a cumulative output signal from a channel to the next adjacent channel in the sequence.

11. A digital signal mixing device as claimed in claim 9, in which signals on the parallel line which interconnects adjacent channels are time division multiplexed to provide for the processing of four simultaneous signals configured as two stereo pairs.

12. A digital signal mixing device as claimed in claim 10, in which signals on the parallel line which interconnects adjacent channels are time division multiplexed to provide for the processing of four simultaneous signals configured as two stereo pairs.

13. A digital signal mixing device as claimed in claim 1, in which control of the signal processing of the said digital signals is effected via a central processing unit having address and data lines connected to the individual signal processing channels and the central processing unit has an associated programme memory for storing data on different signal conditioning processes to be performed on the digital signals by each respective digital signal processing unit in order to condition the respective signals prior to transfer to each respective means to add.

14. A digital signal mixing device as claimed in claim 13, in which the programme memory also stores data for providing an output display representing the signal conditioning processes performed on the respective signals, together with adjustments effected via a keyboard linked to the central processing unit.

15. A digital signal mixing device as claimed in claim 13, in which the programme memory is operable to generate a display on a touch sensitive interactive video display screen indicating available adjustment options to the signal conditioning processes.

16. A digital signal mixing device as claimed in claim 1, comprising a plurality of input channel units for receiving respective analogue input signals from respective analogue signal sources, each input channel unit having a respective analogue-to-digital converter operable to convert an incoming electrical analogue signal into a train of digital number signals each representing the instantaneous value of the analogue signal at an associated sampling instant.

17. A digital signal mixing device as claimed in claim 16, in which each input channel unit has an associated digital signal conditioning means operable selectively to modify the digital number signals, and a common digital signal transfer unit connected to all the said input channel units in sequence for adding the digital number signals from each input channel unit to an accumulated signal formed from the addition of digital number signals from preceding input channels in the sequence.

18. A mixing apparatus for electrical audio signals, said apparatus comprising a plurality of input channel units for receiving respective analogue input signals from respective analogue signal sources, each input channel unit having a respective analogue-to-digital converter operable to convert an incoming electrical analogue signal into a train of digital number signals each representing the instantaneous value of the analogue signal at an associated sampling instant and a respective digital signal conditioning means operable selectively to modify the digital number signals and digital signal transfer unit connecting all the said input channel units in a sequence and incorporating means for sequentially adding the digital number signals from each input channel unit to an accumulated signal formed from the addition of digital number signals from preceding input channels in the sequence, whereby to produce a digital output signal representing the sum of the conditioned digital number signals from the input channel units.

19. An audio signal mixer comprising a plurality of individual signal processing channels each channel having an input connectable to a respective analogue signal source, analogue-to-digital converter means operating to convert the analogue input singnal into a sequence of digital number signals, means for conditioning the digital number signals so produced and an output for conditioned digital number signals from each channel, each individual signal channel having an output connected to a first input of a respective digital number signal summing means having a second input connected to the output of a next adjacent signal summing means whereby to produce an overall output channel signal comprising a mix of all the individually conditioned digital number signals.

20. A digital signal mixing device for generating an output signal from a plurality of different input signals, comprising:

- a plurality of separate signal inputs signal corresponding to respective separate digital number signal processing channels connected together in sequence;
- means connecting each said digital signal processing unit individually to a respective said signal input thereof whereby to receive and condition digital signals arriving from a respective said input to generate a respective said conditioned digital signal; and
- means to add a respective said conditioned digital signal of a said digital signal processing unit to the output signal from the immediately preceding said digital signal processing unit in said sequence whereby to generate a processing unit output signal which is output to the next succeeding said processing unit in said sequence.

* * * * *